(12) United States Patent
Shimada et al.

(10) Patent No.: US 6,337,477 B1
(45) Date of Patent: Jan. 8, 2002

(54) PROBE HAVING MICRO-PROJECTION AND MANUFACTURING METHOD THEREOF

(75) Inventors: Yasuhiro Shimada, Hadano; Takayuki Yagi, Yokohama; Ryo Kuroda, Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/353,153

(22) Filed: Jul. 14, 1999

(30) Foreign Application Priority Data

Jul. 16, 1998 (JP) .......................................... 10-218505

(51) Int. Cl.⁷ .......................... G12B 21/00; G12B 21/02
(52) U.S. Cl. ...................... 250/216; 250/306; 250/307
(58) Field of Search ............................... 250/216, 234, 250/306, 307; 216/11, 84; 369/100, 101, 126; 73/105; 427/251, 304

(56) References Cited

U.S. PATENT DOCUMENTS

| | | | |
|---|---|---|---|
| 5,132,533 A | 7/1992 | Kawase et al. | 250/306 |
| 5,221,415 A | 6/1993 | Albrecht et al. | 156/629.52 |
| 5,260,567 A | 11/1993 | Kuroda et al. | 250/227 |
| 5,317,152 A | 5/1994 | Takamatsu et al. | 250/306 |
| 5,357,108 A | 10/1994 | Suzuki et al. | 250/306 |
| 5,574,279 A | 11/1996 | Ikeda et al. | 250/306 |
| 5,658,698 A | 8/1997 | Yagi et al. | 430/115 |
| 5,673,476 A | 10/1997 | Akaike et al. | 29/825 |
| 5,751,684 A | 5/1998 | Takeda et al. | 369/126 |
| 5,866,021 A * | 2/1999 | Yagi et al. | 216/84 |
| 5,923,637 A | 7/1999 | Shimada et al. | 369/126 |
| 6,011,261 A * | 1/2000 | Ikeda et al. | 250/306 |
| 6,046,972 A * | 4/2000 | Kuroda et al. | 369/126 |
| 6,072,764 A * | 6/2000 | Shido et al. | 369/126 |
| 6,156,215 A * | 12/2000 | Shimada et al. | 216/11 |

OTHER PUBLICATIONS

Akamine, Shinya, et al., "Development of a Microphotocantilever for Near–Field Scanning Optical Microscopy", Micro Electro Mechanical Systems, Sponsored by IEEE Robotics and Automation Society in cooperation with the ASME Dynamic Systems and Control Division, Amsterdam, Netherlands, Jan. 29, Feb. 2, 1995, IEEE Catalog No. 95CH35754, pp. 145–149.

van Hulst, N.F., et al., "Near–Field Optical Microscope Using a Silicon–Nitride Probe", Applied Physics Letters, vol. 62, No. 5, (Feb. 1, 1993), pp. 461–463.

Betzig, E., "Collection Mode N ear–Field Scanning Optical Microscopy", Applied Physics Letters, vol. 51, No. 25 (Dec. 21, 1987), pp. 2088–2090.

Binning, G., et al., "Surface Studies by Scanning Tunneling Microscopy", Physical Review Letters, vol. 49 (Jul. 5–Dec. 27, 1982), pp. 57–61.

* cited by examiner

Primary Examiner—John R. Lee
(74) Attorney, Agent, or Firm—Fitzpatrick, Cella, Harper & Scinto

(57) ABSTRACT

A probe with a micro-projection for a near-field scanning optical microscope (NSOM) which comprises a substrate, first and second junction layers which are arranged on the substrate and electrically isolated from each other and which are made of an electroconductive material, and a micro-projection bonded to the substrate by way of the first and second junction layers and having a cavity in the inside. The micro-projection has first and second material layer made of different respective materials and laid one on the other to form a junction interlayer therebetween. The first and second material layers are electrically connected to the first and second junction layers respectively and independently.

22 Claims, 10 Drawing Sheets

PROBE HAVING MICRO-PROJECTION AND MANUFACTURING METHOD THEREOF

BACKGROUND OF THE INVENTION

1. Field of the Invention

This invention relates to a probe having a micro-projection and also to a method of manufacturing such a probe. More particularly, the present invention relates to a probe having a micro-projection and adapted to detect an evanescent wave used in a near field scanning optical microscope as well as a method of manufacturing such a probe. More specifically, the present invention relates to a probe having a micro-projection with a tip having a small radius of curvature, which perform well in the above application with a multiple arrangement, and which can be manufactured on a mass production basis, as well as a method of manufacturing such a probe.

2. Related Background Art

The recent invention of the scanning tunneling microscope (hereinafter referred to as "STM") made it possible to visually observe the electronic arrangement of the surface atoms of an electrocoductive specimen [G. Binnig et al. Phys. Rev. Lett., 49, 57 (1983)] so that now a real space image of a specimen is visually observable with an enhanced level of resolution, regardless if it is crystalline or amorphous. Since then, massive research efforts have been paid on the scanning probe microscope (hereinafter referred to as "SPM") particularly in the technological field of evaluation of fine structures of various materials.

The SPM includes the scanning tunneling microscope (STM) adapted to scrutinize the surface structure of a specimen by utilizing the tunnel current, the atomic force, the magnetic force or the light caused there when the probe having a micro-projection is brought close to the specimen, the atomic force microscope (AFM), the magnetic force microscope (MFM) and the near field scanning optical microscope (NSOM).

Of the SPM, the SNOM is used to observe, in a non-destructive way, the surface of a specimen showing a fine pattern by means of evanescent light emitted from a very small pin-hole with an enhanced level of positional resolution of less than λ/2 that has been unachievable by any known optical microscope.

With the SNOM, it is possible to observe a specimen of part of the body of a living thing or a cell that used to be hardly observable. Therefore, it has broadened the scope of observable specimens as well as its applications.

Three techniques are known for detecting an evanescent wave.

With a first known technique, illuminant light is applied to the surface of a specimen from the rear side in a way of allowing total reflection of light of the surface and the evanescent wave generated on the surface of the specimen by the illuminant light is detected by way of a micro-projection having a micro-aperture (E. Betzig, et al., "Collection mode near-field scanning optical microscopy", Appl. Phys. Lett. 51 (25), 1987, pp2088–2090). With this technique, an image of an evanescent wave can be obtained with an enhanced level of resolution and it currently provides the most extensive theme of study.

This first technique, however, uses a sharpened glass pipette or glass fiber as a micro-projection, which is manufactured by machine-grinding. This leads to poor productivity and high production cost, and it is difficult to manufacture the aperture with good reproducibility and high precision.

With a second known technique, scattered light of an evanescent wave is detected by means of a thin film cantilever having a micro-projection with no aperture and made of silicon nitride film that is used for the AFM (N. F. van Hulst, et al., "Near-field optical microscope using a silicon-nitride probe", Appl. Phys. Lett. 62 (5), 1993, pp461–463).

A micro-projection to be used for the above technique may be a micro-projection of monocrystal silicon that can be prepared by using anisotropic etching that is popular in the field of semiconductor manufacturing process technology (U.S. Pat. No. 5,221,415)

FIGS. 1A through 1G show a typical known method for preparing such a micro-projection. Firstly, a pit 518 is formed by anisotropic etching in a silicon wafer 514 coated with silicon dioxide mask layers 510, 512 as shown in FIG. 1A. Then, as shown in FIG. 1B, the silicon dioxide layers 510, 512 are removed and then the wafer is coated with silicon nitride layers 520, 521 over the entire surface thereof to produce a cantilever and a pyramid-shaped pit 522 that operates as a female mold for molding a micro-projection. Subsequently, as shown in FIG. 1C, the silicon nitride layer 520 is patterned to the form of a cantilever. Thereafter, as shown in FIG. 1D, the silicon nitride layer 521 on the rear side is removed and a glass plate 530 having a saw-cut 534 and a Cr layer 532 is bonded to the silicon nitride layer 520. Then, the glass plate 530 is machined to form a mountain block 540 as shown in FIG. 1E. Subsequently, the silicon wafer 514 is etched out to produce a probe supported by the mountain block 540 and provided with a micro-projection of silicon nitride and a cantilever as shown in FIG. 1F. When it is used for a optical lever type AFM, a metal film layer 542 is formed on the top as a reflection layer as shown in FIG. 1G. This technique can produce a micro-projection showing a very acute profile at the tip and provides a high productivity and a high reproducibility.

However, an NMOS image obtained by using a micro-projection prepared by means of this second technique shows a level of resolution lower than an NMOS obtained by using a micro-projection with an aperture prepared by means of the above first technique.

While the above two known techniques provide a micro-projection to be used as an optical pickup so that an evanescent wave is detected by a photo detector comprising a photomultiplier arranged at an upper part of the micro-projection, a known third technique provides a method of directly detecting scattered light of an evanescent wave by a photodiode on a thin film cantilever (S. Akamine, et al., "Development of a microphotocantiliver for near-field scanning optical microscopy", Procedings IEEE Microelectro Mechanical Systems Workshop 1995, p145–150). FIG. 2 shows a cross sectional view of such a micro-projection.

Referring to FIG. 2, the illustrated micro-projection comprises a silicon thin film cantilever of a p-layer 601 supported by a silicon substrate 600 at the end thereof, a p-n junction 603 photodiode prepared by forming an n-layer 602 and Al metal wires 605 arranged on a silicon oxide film 604 to take out the signal of scattered light detected by the photodiode. An etching stop layer 606 used when preparing the cantilever is found on the lower surface of the thin film cantilever. As a result of arranging a photo detecting section of a photodiode at the free end of the cantilever, the photo detecting section and the specimen can be brought close to each other to improve the S/N ratio and the resolution of the output. Additionally, the system configuration can be simplified by this technique.

However, this third technique uses the tip of the thin film cantilever as the tip of the probe 607 and the thin film cantilever is prepared by means of a photolithography process and etching so that the micro-projection is less reproducible and it is difficult to produce a lot of products showing the same and identical tip profile if compared with the micro-projection of the second known technique.

SUMMARY OF THE INVENTION

Therefore, it is an object of the present invention to solve the above identified problems of the known techniques and provide a probe with a micro-projection that shows an improved S/N ratio and an excellent level of resolution for the detection of light or temperature and also a method of manufacturing such a probe.

Another object of the invention is to provide a probe showing a highly reproducible uniform profile and having a sharp tip that can be manufactured at reduced cost with an improved productivity and also a method of manufacturing such a probe.

According to a first aspect of the invention, the above objects are achieved by providing a probe with a micro-projection comprising:

a substrate;

first and second junction layers arranged on said substrate and electrically isolated from each other, said first and second junction layers being made of an electrocoductive material;

a micro-projection bonded to said substrate by way of said first and second junction layers and having a cavity in the inside;

said micro-projection having first and second material layers made of different respective materials and laid one on the other to form a junction interlayer therebetween, said first and second material layers being electrically connected to said first and second junction layers respectively and independently.

According to a second aspect of the present invention, there is provided a method of manufacturing a probe with a micro-projection comprising steps of:

forming a recess on the surface of a first substrate;

forming first and second material layers made of different respective materials and laid one on the other to form a junction interlayer therebetween on the surface of the first substrate having said recess;

forming first and second junction layers made of an electrocoductive material and electrically isolated from each other on a second substrate;

bonding said first and second material layers on said first substrate respectively to the first and second junction layers on the second substrate, the first and second material layers being electrically connected to the first and second junction layers respectively and independently;

separating the first and second material layers bonded to the first and second junction layers from the first substrate so as to produce a micro-projection having a cavity inside from the first and second material layers formed on the recess of the first substrate.

DESCRIPTION OF THE PREFERRED EMBODIMENTS

Figure 1A:
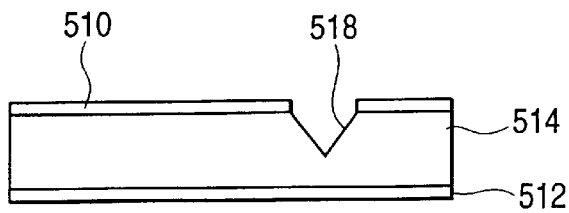
FIGS. 1A, 1B, 1C, 1D, 1E, 1F and 1G are schematic cross sectional views showing a manufacturing method of a known probe with a micro-projection.
Figure 1B:
Figure 1C:
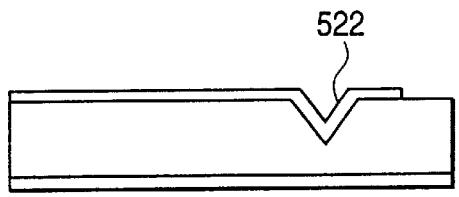
Figure 1D:
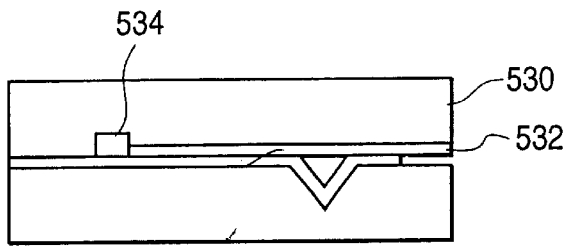
Figure 1E:
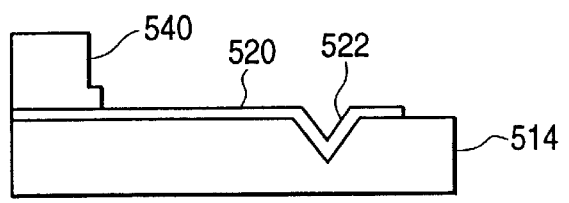
Figure 1F:
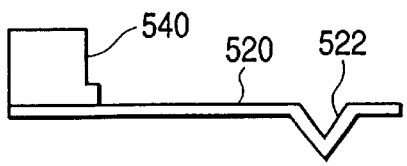
Figure 1G:
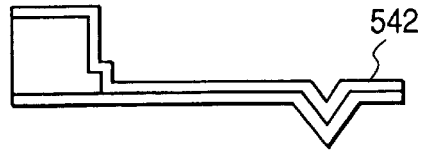
Figure 2:
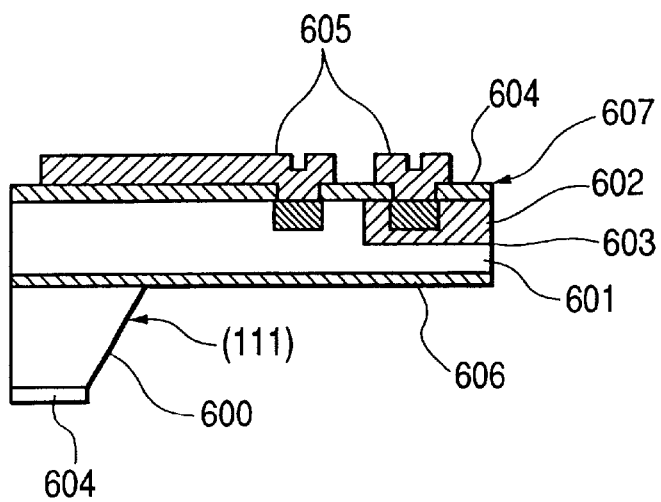
FIG. 2 is a schematic cross sectional view of a known probe with a micro-projection.
Figure 3:
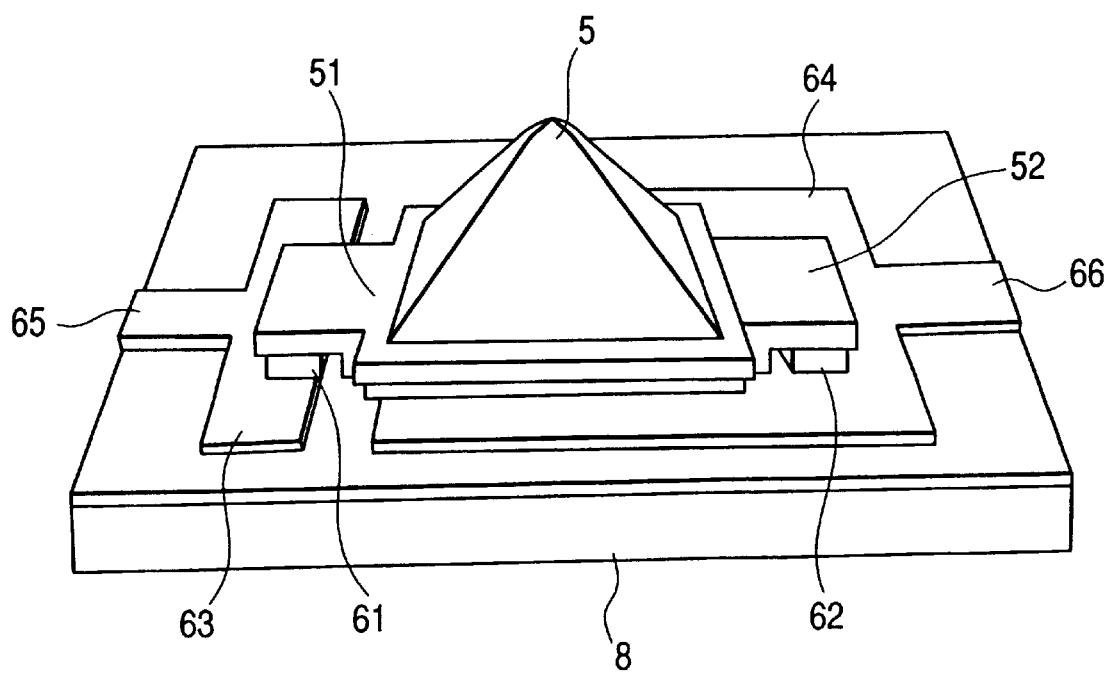
FIG. 3 schematic perspective view of a first embodiment of the probe with a micro-projection according to the invention.

FIG. 3 is a schematic perspective view of a first embodiment of the probe with a micro-projection according to the invention, which is a photo detecting probe, said micro-projection having two semiconductor layers of different conduction types formed on a substrate.

Referring to FIG. 3, a pyramid-shaped micro-projection 5 is bonded onto first and second junction layers 63 and 64 that are formed on a substrate 8. The micro-projection 5 has a cavity in the inside between itself and the substrate. The micro-projection 5 comprises a first semiconductor layer 51 and a second semiconductor layer 52 having different respective conductivity types. The first semiconductor layer 51 is bonded to a first junction layer 63 directly or by way of a first junction assisting layer 61. The second semiconductor layer 52 is bonded to a second junction layer 64 directly or by way of a second junction assisting layer 62. The first semiconductor layer 51 and the second semiconductor layer 52 have a pn junction along their interface.

The first junction layer 63 and the second junction layer 64 are connected respectively to a first wire 65 and a second wire 66.

Now, the steps of manufacturing the above described first embodiment will be described by referring to FIGS. 4A through 4G.

Figure 4A:
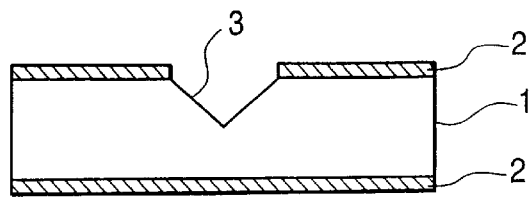
FIGS. 4A, 4B, 4C, 4D, 4E, 4F and 4G are schematic cross sectional views showing a manufacturing method of the probe with a micro-projection of the first embodiment.

Firstly, a recess 3 is formed on the surface of a first substrate 1 as shown in FIG. 4A. To do this, firstly a protection layer 2 is formed on the first substrate 1 and then subjected to a patterning operation using photolithography and etching to partly expose the silicon of the substrate by removing the protection layer 2 in a desired area. Then, the silicon is etched to form the recess 3 typically by means of crystal axis anisotropic etching. The protection layer 2 is typically made of silicon dioxide or silicon nitride. The first substrate 1 is preferably a monocrystal silicon substrate with planar bearing (100) so that an inverted pyramid-shaped recess surrounded by four crystal planes equivalent to (111) plane can be formed there by crystal axis anisotropic etching using an alkaline etching solution. Then, the material of a micro-projection is arranged on the monocrystal substrate carrying a recess formed by crystal axis anisotropic etching. The recess used as a female mold shows a sharp tip and, if a plurality of such recesses are formed on the same substrate, the shape can be of the same size so that the resulting micro-projections have identical characteristics.

Figure 4B:
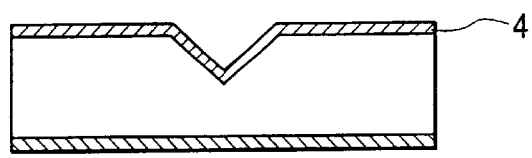

Then, after removing the protection layer used as mask, a peelable layer 4 is formed as shown in FIG. 4B. The peelable layer 4 should be made of a material that makes the layer easily removable from the surface of the micro-projection. Therefore, the material of the peelable layer 4 is required to have low reactivity and adhesion to the surface of the micro-projection. The material may be selected appropriately from metals, semiconductors and insulators, depending on the combination of the material of the micro-projection and that of the first substrate 1. For example, the peelable layer 4 may be a silicon dioxide ($SiO_2$) film layer formed by thermally oxidizing the surface of the silicon recess of the first substrate. This technique is advantageous in that the tip of the micro-projection can be made to show a small radius of curvature. This technique utilizes the phenomenon that the film thickness of a silicon dioxide film produced by thermal oxidation can be made to vary as a function of the profile of the silicon. Thus, the radius of curvature of the tip of the micro-projection can be controlled by controlling the film thickness of the silicon dioxide film formed by thermal oxidation.

Alternatively, the peelable layer may be a film of PSG (phosphor silicate glass) formed by CVD. Then, the profile of the tip can be modified by thermally treating the produced PSG film. Still alternatively, the peelable layer may be a film of a poorly reactive noble metal such as Pt formed by sputtering.

Figure 4C:
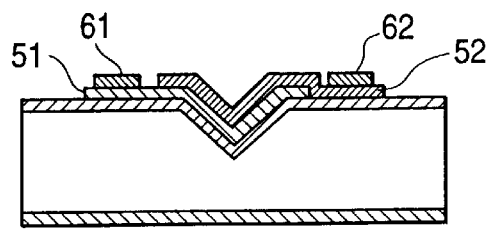

Then, a micro-projection is formed to operate as detecting section as shown in FIG. 4C. In the case of photo detection using a photodiode, the first semiconductor layer 51 is formed and then subjected to a patterning operation before the second specimen layer 52 is formed and subjected to a patterning operation. The material of the first semiconductor layer 51 and that of the second semiconductor layer 52 will be so selected that they produce a photoelectric effect along the bonded interface. For instance, the first semiconductor layer 51 will be made of a p-type semiconductor whereas the second semiconductor layer 52 will be made of an n-type semiconductor to produce a pn junction at the interface.

The material of each of the semiconductor layers will be selected from semiconductor elements such as silicon and germanium and compound semiconductors such as gallium-arsenic and indium-phosphor that may or may not contain an impurity dopant showing a desired impurity distribution pattern. The semiconductor layers may be bonded in the form of a junction of two silicon type layers or a hetero junction of layers of two different materials.

The semiconductor layers may be formed by a known thin film forming technique selected from vacuum evaporation, sputtering, chemical vapor phase growth and thin film application. Then, they are patterned to show a desired profile by means of photolithography and etching. For example, if they are made of a silicon type material, amorphous silicon can be prepared by CVD principally using silane gas. It is also possible to use serene type amorphous chalcogenide produced by vacuum evaporation or a gallium-arsenic type material produced by sputtering.

Then, if necessary, first and second junction assisting layers 61, 62 to be connected respectively to the first and second semiconductor layers 51, 52 will be formed. These may be necessary to equalize the heights of the pressure bonding surfaces in a subsequent pressure bonding step. If the junction layers and the semiconductor layers are made of respective materials that can hardly be bonded to each other under pressure, a layer of a material that can be directly bonded to the corresponding junction layer may be formed on each of the semiconductor layers. First and second junction assisting layers may be formed to form electrically ohmic contacts or contacts having a barrier. A light blocking layer may be formed before forming the first semiconductor layer 51. If such is the case, two semiconductor layers will be formed after forming a light blocking layer that is typically made of metal and patterning the layer, and the tip of the micro-projection will be removed to produce a micro-aperture in the step of forming either of them in order to improve the level of resolution of detection.

Then, a first junction layer 63, a second junction layer 64, a first wire (not shown) and a second wire (not shown) are formed on the second substrate 8. The junction layers are preferably made of a metal material so that the electrodes arranged to draw an electric current may be utilized for the junction layers. Then, the manufacturing process can be simplified significantly. For instance, if both the junction assisting layers and the junction layers are made of gold, an Au-Au metal bond will be produced as a result of pressure bonding to provide a bonding effect without difficulty. A known thin film forming technique selected from vacuum evaporation, sputtering, chemical vapor phase growth, plating and thin film application may be used for forming the junction layers, which will then be subjected to a patterning operation using photolithography and etching.

Then, the first and second semiconductor layers 51, 52 on the peelable layer 4 including said recess 3 are bonded over the first junction layer 63 and the second junction layer 64. Alignment units that can hold the respective substrates by means of a vacuum chuck will be used to align the semiconductor layer on the first substrate 1 and the junction layer on the second substrate 8 so that they are arranged vis-a-vis and held in contact with each other. Then, the substrate layer and the junction layer will be bonded (bonded under pressure) by applying a load onto them.

Figure 4D:
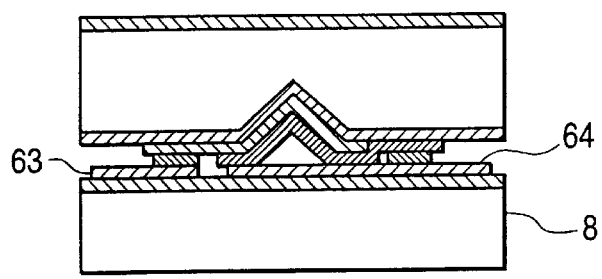
Figure 4E:
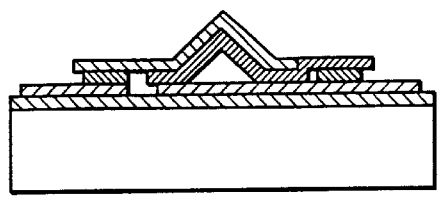

Thereafter, as shown in FIG. 4E, the peelable layer 4 is peeled off from the first and second semiconductor layers 51, 52 along the interface thereof to transfer the semiconductor layers comprising a micro-projection onto the junction layers. In other words, as the first substrate 1 and the second substrate 8 are separated from each other, a micro-projection is produced on the second substrate 8 as shown in FIG. 4E.

Figure 4F:
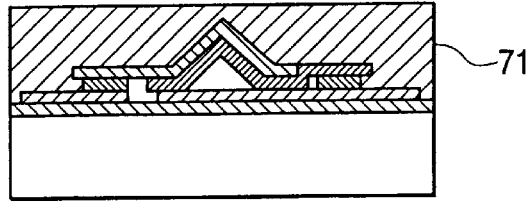
Figure 4G:
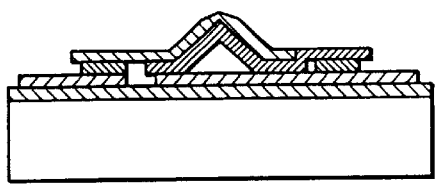

Subsequently, the film thickness of the first semiconductor layer 51 will be adjusted, if necessary. To do this, a resist 71 is applied to the top of the first semiconductor layer 51 until the surface becomes flat as shown in FIG. 4F. Then, the tip of the first semiconductor layer 51 is exposed by etching, and then the tip of the first semiconductor layer 51 is further etched in a manner as shown in FIG. 4G. With this technique, the distance between the tip of the probe and the junctions can be adjusted to make the probe highly sensitive for detecting operations. Now, a photo detecting probe is produced as a result of the above steps.

Meanwhile, for the purpose of the invention, a layer for producing an elastic body such as a cantilever is formed in advance on the second substrate, and a patterned junction layer is formed on the elastic body. Then, after bonding the semiconductor layer comprising a micro-projection on the peelable layer 4 onto the junction layer and transferring it, the second substrate is partly removed from under the elastic body in such a way that the elastic body is fixed to the second substrate at the end thereof. With this process, a cantilever type probe carrying a micro-projection on the free end thereof can be prepared. The micro-projection reflects the surface profile of the recess formed on the first substrate with complete fidelity and a cavity is formed between the micro-projection and the junction layers. The cantilever carrying a micro-projection on the free end thereof prepared in this way is lightweight and hence the resonance frequency of the cantilever carrying the micro-projection can be reduced.

An aperture may be formed at the tip of the micro-projection. More specifically, when the peelable layer is made of silicon dioxide formed by thermal oxidation and the substrate inclined with respect to the evaporation source is rotated to form a semiconductor film by vacuum evaporation, the sharpened part of the recess is shielded against vacuum evaporation so that a micro-aperture can be formed there. Alternatively, a micro-aperture may be formed by forming a resist film until a flat surface is produced after bonding the micro-projection in position under pressure, exposing the tip of the micro-projection by dry etching and further etching the micro-projection by using the resist as mask. Then, the produced probe can be used as a light-emitting/light-receiving probe if it is so arranged that light can be irradiated through the micro-aperture. The evanescent light detection sensitivity of the probe can be improved by arranging a mirror within the micro-projection in such a way that scattered light entering the projection through the micro-aperture is reflected by the mirror and absorbed by the semiconductor in the inside of the micro-projection.

With a photo detecting probe of said first embodiment can be used as avalanche photo diode by reversely biasing the part of the pn junction of the probe. In this case, a potential barrier will have to be formed to establish a withstand voltage relative to the reverse bias. Techniques that can be used to establish a withstand voltage for the purpose of the invention include the following.

(a) Forming a Schottky junction along the interfaces of the junction assisting layers and the semiconductor layers.
(b) Producing a potential barrier by making the junction assisting layers have a two-layered structure of a metal layer and an insulation layer.
(c) Producing a intra-planar dopant concentration distribution pattern by forming a mask layer followed by patterning thereof after forming the semiconductor layers to implant ions into the semiconductor layers. For instance, a withstand voltage in applying a reverse bias can be established by forming a small region of a low dopant concentration in part of the semiconductor layers.

Then, as the tip of the micro-projection of the photo detecting probe is brought close to a specimen, the evanescent light locally existing on the surface of the specimen is scattered so that the probe operates for photo detection by detecting the electromotive force generated at the pn junction by the light absorbed into the inside of the micro-projection. Then, the S/N ration of the output of the probe will be improved to provide an excellent level of resolution.

Additionally, since a micro-projection can be produced by transferring the two semiconductor layers formed on the peelable layer on the first substrate onto the junction layer on the second substrate, it is not necessary to remove the first substrate by etching in a later step so that the micro-projection can be formed easily and accurately simply in the above bonding and transferring steps to improve the productivity of the method of manufacturing such a probe.

Still additionally, the first substrate that operates as a female mold can repeatedly be used by forming another micro-projection after the transferring step to reduce the cost of manufacturing probes. Also, the reproducibility of the profile of the micro-projection can be maintained because the same female mold is used repeatedly.

While a photo detecting probe according to the invention is described above in terms of a probe having a pn junction, other combinations of different materials can feasibly be used for two different layers depending on an object. For example, a Schottky type photo detecting probe can be obtained by combining a semiconductor layer and a metal layer. A temperature sensing probe can be obtained by combining two metal layers that can produce a thermo-couple. Such a temperature sensing probe will show an improved level of resolution and a reduced response time.

Now, the present invention will be described further by way of examples.

EXAMPLE 1

A proximity field photo detecting probe having a configuration as shown in FIG. 3 was prepared. The first semiconductor layer 51 was made of p-type silicon and the second semiconductor layer 52 was made of n-type silicon so that a pn junction interface was formed between the first semiconductor layer 51 and the second semiconductor layer 52.

The probe was prepared by a method as illustrated in FIGS. 4A through 4G.

Firstly, as shown in FIG. 4A, a monocrystal silicon wafer with planar bearing (100) was used for the first substrate 1. Then, a thermally oxidized silicon film was formed to a thickness of 100 nm for the protection layer 2, which was subsequently subjected to a patterning operation to remove a desired area thereof and expose the underlying silicon by a 4 $\mu$m square by means of photolithography and etching. Thereafter, the exposed silicon was etched by means of a crystal axis anisotropic etching process conducted for 10 minutes, using an 30% aqueous solution of potassium hydroxide heated to 90° C. As a result, a 3 $\mu$m deep inverted-pyramid-shaped recess 3 was produced and surrounded by four planes equivalent to plane (111).

Then, the protection layer used as mask was removed and a peelable layer 4 of platinum was deposited to a thickness of 50 nm by sputtering as shown in FIG. 4B.

Then, a micro-projection was prepared as shown in FIG. 4C. To do this, firstly p-type silicon was deposited to a thickness of 100 nm by CVD (chemical vapor deposition), using a mixed gas of silane and diborane. It was then subjected to a patterning operation to produce a first semiconductor layer 51 by photolithography. Thereafter, n-type silicon was deposited to a thickness of 100 nm by CVD, using a mixed gas of silane and phosphine. It was then subjected to a patterning operation to produce a second semiconductor layer 52 by photolithography. A dry etching process using $SF_6$ was employed to etch the silicon.

Then, a first junction assisting layer 61 and a second junction assisting layer 62 were formed by depositing titanium and gold to respective thicknesses of 5 nm and 100 nm for each of them by means of sputtering and subjecting the layers to a patterning operation, using a photolithography technique. The deposited gold layers were etched by using an aqueous solution of a mixture of iodine and potassium iodide, whereas the deposited titanium was etched by using a mixture of hydrogen peroxide and aqueous ammonium.

Then, a silicon substrate carrying an oxide film on the surface was used for the second substrate 8 as shown in FIG. 4D. Subsequently, Cr and Au were deposited onto the surface to respective thicknesses of 5 nm and 300 nm by vacuum evaporation, and the produced film layer was subjected to a patterning operation to produce a first junction layer 63, a second junction layer 64, a first wire (not shown) and a second wire (not shown) by photolithography and etching.

Then, the first and second semiconductor layers 51, 52 on the first substrate 1 and the first and second junction layers 63, 64 on the second substrate 8 were arranged vis-a-vis and held in contact with each other. Then, the first and second semiconductor layers 51, 52 and the first and second junction layers 63, 64 were bonded (bonded under pressure) by applying a load to them.

Subsequently, as shown in FIG. 4E, the first substrate 1 and the second substrate 8 were separated from each other along the interface of the peelable layer 4 and the micro-projection 5. At this stage, the micro-projection showed a height of about 3 $\mu$m from the substrate surface.

Then, as shown in FIG. 4E, a resist 71 was applied to the surface of the second substrate until a flat surface is produced there. Subsequently, the tip of the micro-projection of the first semiconductor layer 51 was exposed by means of a dry etching process using $O_2$ gas, and then the tip was etched also by means of a drying etching process using $SF_6$ gas. Thus, it was possible to adjust the distance between the tip of the probe and the pn junction and make the probe have an improved detection sensitivity. Now, an intended photo detecting probe was produced.

The photo detecting probe of this example functioned as photodiode, where holes or electrons generated along the interface of the first semiconductor layer and the second semiconductor layer by the photoelectric effect of photons absorbed by the micro-projection were moved to the first electrode or the second electrode to give rise to an electric current.

Figure 5:
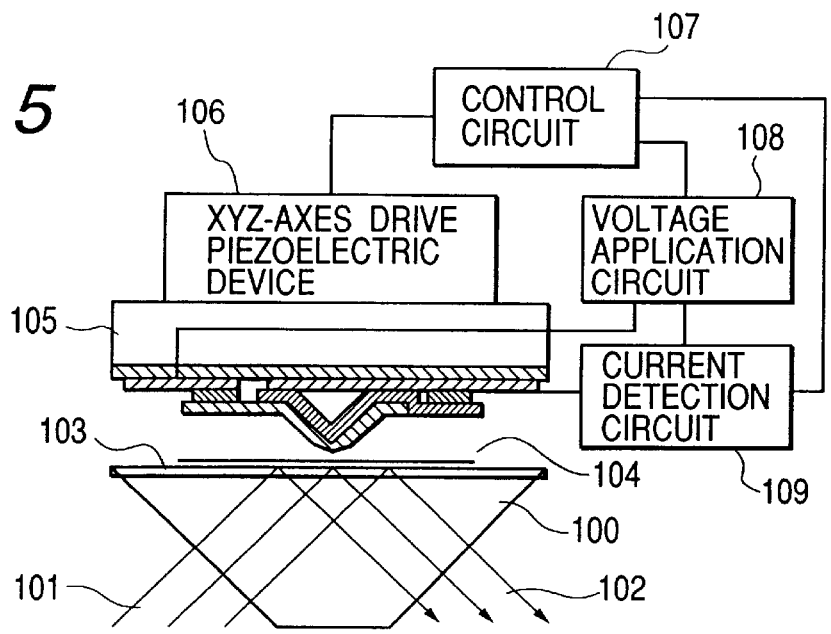
FIG. 5 is a characteristic block diagram of a surface observation apparatus using the first embodiment of the probe with a micro-projection.

FIG. 5 is a schematic block diagram of a surface observation apparatus incorporating the photo detecting probe of this example into a reflection type proximity field optical microscope.

Referring to FIG. 5, the probe 105 of this example is arranged vis-a-vis to the specimen 103 on a prism 100. The probe 105 is connected to an XYZ-axes drive piezoelectric device 106. Electric current detection circuit 109 detects the electric current produced by the electromotive force generated at the pn junction. A voltage application circuit 108 is used to apply a voltage between the two semiconductor layers of the probe 105. A control circuit 107 drives the XYZ-axes drive piezoelectric device 106 according to the detection signal of the current detection circuit 109. The specimen 103 is observed through this surface observation apparatus under a condition where the beams of incident light are totally reflected by the surface of the specimen 103. Reference numeral 102 in FIG. 5 denotes the beams of reflected light. Under this condition, evanescent light 104 locally exists on the surface of the specimen 103. As the micro-projection of the probe 103 is brought closer to the specimen 103 under this condition, scattered light is produced by the evanescent light 104 and absorbed into the inside of the micro-projection to generate electromotive force at the pn junction. The surface of the specimen 103 can be observed by detecting the electric current produced by the electromotive force by means of the current detection circuit 109. The probe of this example can be made to operate as avalanche photodiode by applying a reverse bias voltage to the pn junction by means of a voltage application circuit 108, so that a faint signal can be detected by amplifying it. In an experiment where a scanning type proximity field optical microscope was prepared by using the photo detecting probe of this example in order to observe a specimen through the microscope, a resolution of about 20 nm was achieved. A short response time of the detecting operation was achieved because the cavity in the micro-projection made it possible to reduce the electric capacitance of the detecting section of the microscope.

EXAMPLE 2

Figure 6A:
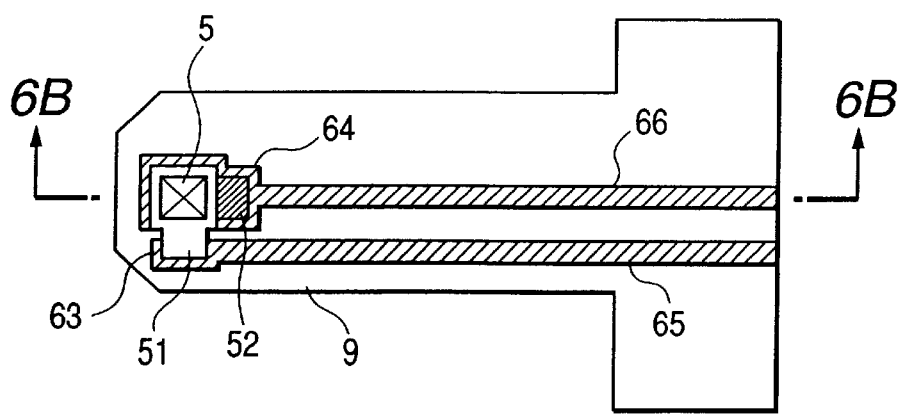
FIGS. 6A and 6B are a schematic plan view and a schematic cross sectional view of a second embodiment of the probe with a micro-projection according to the invention.
Figure 6B:
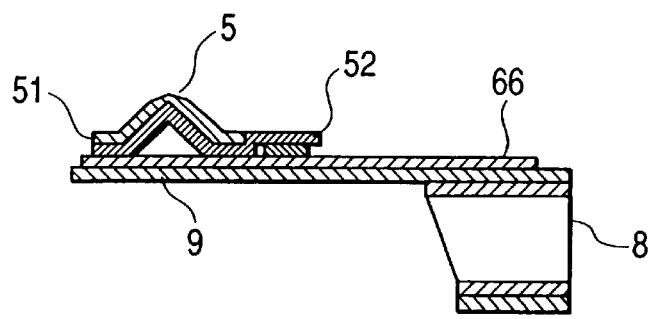

FIGS. 6A and 6B schematically illustrate a second embodiment of the invention comprising a micro-projection formed on a cantilever. FIG. 6A is a schematic plan view and FIG. 6B is a schematic cross sectional view taken along line 6B—6B in FIG. 6A. In this embodiment, the cantilever 9 of an elastic body is formed on a second substrate 8 and a first junction layer 63 and a second junction layer 64 are formed at the front end of the cantilever 9. A first semiconductor layer 51 and a second semiconductor layer 52 are bonded respectively onto the first junction layer 63 and the second junction layer 64. The first and second semiconductor layers comprises a micro-projection 65 having a cavity in the inside. The first and second junction layers 63, 64 are electrically connected to a first wire 65 and a second wire 66 respectively.

FIGS. 7A through 7E illustrate the process through which the above second embodiment was prepared.

Firstly, a peelable layer 4, the first semiconductor layer 51, the second semiconductor layer 52, a first junction assisting layer (not shown) and a second junction assisting layer (not shown) were formed on a recess formed in the first substrate 1 in a manner as described above by referring to FIGS. 4A through 4C.

Then, a monocrystal silicon substrate was used for the second substrate 8, on the opposite surfaces of which a 0.3 $\mu$m thick silicon dioxide film layer 13 and a 0.5 $\mu$m thick silicon nitride film layer 14 were formed. Then, the silicon nitride film layer 14 on the front surface was subjected to a patterning operation to produce a cantilever by photolithography and etching. The cantilever had a width of 50 $\mu$m and a length of 300 $\mu$m. Then, the silicon nitride film layer 14 on the rear surface and the silicon dioxide film layers 13 were etched to produce an etching mask. Subsequently, a 3 nm thick titanium Ti film and a 50 nm thick gold Au film were formed and subjected to a patterning operation to produce a first junction layer (not shown), a second junction layer 64, a first wire (not shown) and a second wire 66 on the silicon nitride film layer 14 by photolithography and etching.

Figure 7A:
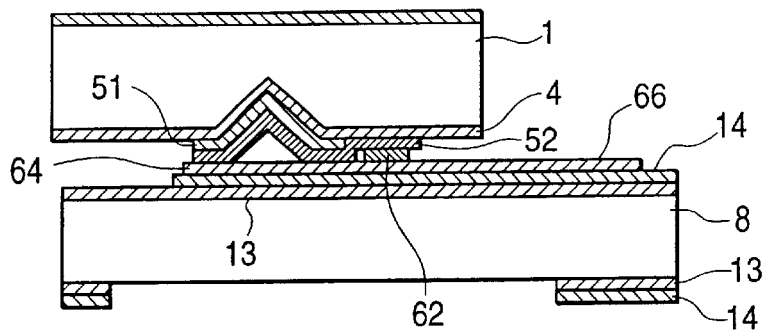
FIGS. 7A, 7B, 7C, 7D and 7E are schematic cross sectional views showing a manufacturing method of the probe with a micro-projection of the second embodiment.

Then, as shown in FIG. 7A, the first and second semiconductor layers 51, 52 formed on the first substrate 1 were aligned with the first junction layer (not shown) and the second junction layer 64 on the silicon nitride film layer 14 of the cantilever and respectively brought into contact by way of a first junction assisting layer (not shown) and a second junction assisting layer (not shown). Then, the first and second semiconductor layers 51, 52 and the first junction layer (not shown) and the second junction layer 64 were bonded together (bonded under pressure) by applying a load onto them.

Figure 7B:
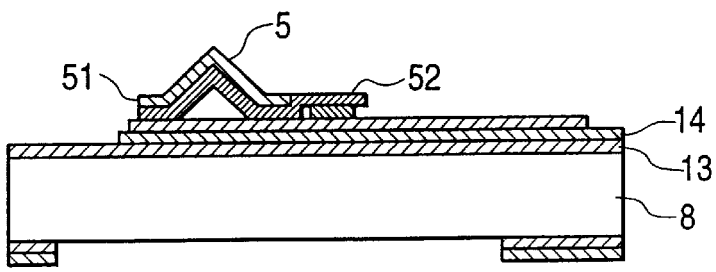

Then, as shown in FIG. 7B, the two substrates were separated from each other along the interface of the peelable layer 4 and the first and second semiconductor layers 51, 52 to transfer the first and second semiconductor layers 51, 52 comprising a micro-projection 5 onto the silicon nitride film layer 14.

Figure 7C:
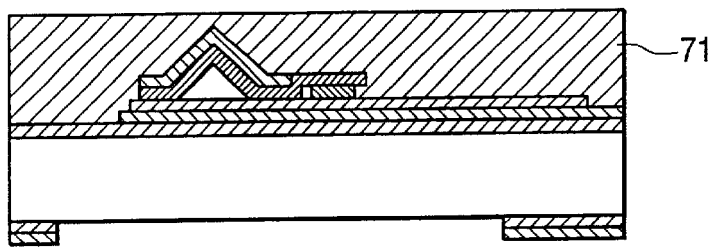
Figure 7D:
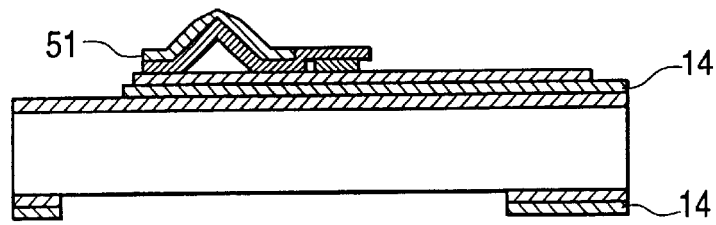

Thereafter, as shown in FIG. 7C, a resist 71 was applied to make it show a flat surface, and then the tip of the first semiconductor layer 51 of the micro-projection 5 was exposed by etching. Then, as shown in FIG. 7D, the tip of the first semiconductor layer 51 was etched to adjust the distance between the tip and the pn junction.

Figure 7E:
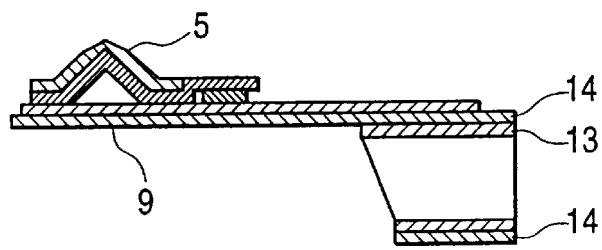

After forming a polyimide layer on the surface of the second substrate 8 by spin-coating and baking it into a protection layer, the silicon substrate 8 was etched from the rear surface by means of a 30% aqueous solution of potassium hydroxide heated to 90° C. using the silicon nitride film layer 14 on the rear surface as mask. Then, the silicon dioxide film layer 13 was removed by means of an aqueous solution of mixture of hydrofluoric acid and ammonium fluoride. Finally, the protection layer on the front surface was removed by means of oxygen plasma to produce a cantilever 9 of a silicon nitride film layer. Thus, a cantilever type probe as shown in FIG. 7E was prepared.

With the cantilever 9 having the photo detecting micro-projection 5 formed on it as that of this example, it is possible to conduct a photo detecting operation, while observing the surface profile of a specimen using the technique of atomic force microscopy (AFM) employing an optical lever. Thus, optical information could be collected from the specimen by scanning the specimen within a certain limit of load to observe the specimen without damaging it.

While the cantilever of this example was made of a silicon nitride, a cantilever may alternatively be made of monocrystal silicon by using an SOI (silicon on insulator) substrate. Then, a piezoelectric resistance layer may be arranged within the silicon substrate to detect the deflection of the cantilever.

The technique of this example for forming a micro-projection on an elastic body can be applied to any of the embodiments as will be described hereinafter.

EXAMPLE 3

In Example 3, a third embodiment of the probe of the present invention was prepared as a proximity field photo detecting probe by a third mode of carrying out the method of manufacturing a probe according to the invention. The probe of this example has a basic configuration same as that of the first embodiment shown in FIG. 3.

However, this embodiment differs from the first embodiment of FIG. 3 in that a light shield layer 53 is formed on the surface of the first semiconductor layer 51 of the micro-projection and an aperture is formed at the front end of the light shield layer.

FIGS. 8A through 8F illustrate the method used for preparing the proximity field probe of this example.

Figure 8A:
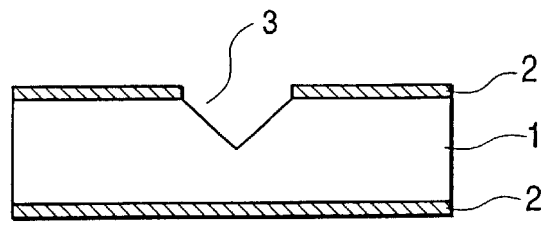
FIGS. 8A, 8B, 8C, 8D, 8E and 8F are schematic cross sectional views showing a manufacturing method of the probe with a micro-projection of a third embodiment according to the invention.
Figure 8B:
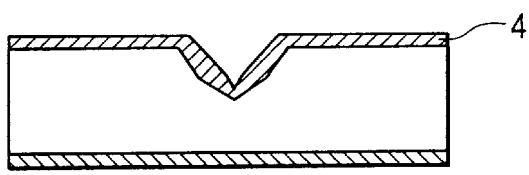

Firstly, as shown in FIG. 8A, a monocrystal silicon wafer with planar bearing (100) was used for the first substrate 1. Then, a 100 nm thick thermally oxidized silicon film was formed for the protection layer 2, which was subsequently subjected to a patterning operation to remove a desired area thereof to expose the underlying silicon by a 4 μm square by means of photolithography and etching. Thereafter, the exposed silicon was etched in a crystal axis anisotropic etching process conducted for 10 minutes using an 30% aqueous solution of potassium hydroxide heated to 90° C. As a result, a 3 μm deep inverted-pyramid-shaped recess 3 was produced and surrounded by four planes equivalent to plane (111).

Then, the protection layer 2 which was a thermally oxidized silicon film was removed by means of an aqueous solution of a mixture of hydrofluoric acid and ammonium fluoride (HF:NH$_4$F=1:5). Thereafter, the first substrate 1 was cleansed by means of a mixed solution of sulfuric acid and hydrogen peroxide heated to 120° C. and a 2% aqueous solution of hydrofluoric acid. Then, the first substrate 1 was heated to 1,000° C. in an atmosphere of oxygen and hydrogen, using an oxidation furnace, to produce a 400 nm thick silicon deposit for the peelable layer 4.

Figure 8C:
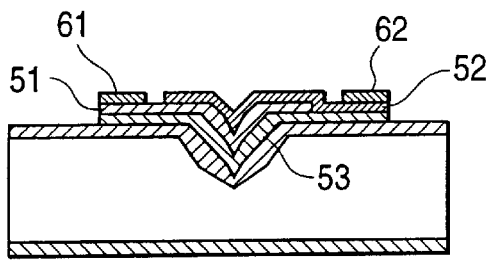

Then, a micro-projection was prepared as shown in FIG. 8C. To do this, firstly a 100 nm thick gold film layer was formed by sputtering, and then p-type silicon was deposited to a thickness of 100 nm by CVD (chemical vapor deposition) using a mixed gas of silane and diborane. It was then subjected to a patterning operation to produce a first semiconductor layer 51 by photolithography. Thereafter, n-type silicon was deposited to a thickness of 100 nm by CVD using a mixed gas of silane and phosphine. It was then subjected to a patterning operation to produce a second semiconductor layer 52 by photolithography. A dry etching process using SF$_6$ was employed to etch the silicon. Then, a first junction assisting layer 61 and a second junction assisting layer 62 were formed by depositing titanium and gold to respective thicknesses of 5 nm and 100 nm for each of them by means of sputtering and subjecting the produced layers to a patterning operation using a photolithography technique. The deposited gold layer was etched by using an aqueous solution of a mixture of iodine and potassium iodide, whereas the deposited titanium was etched by using a mixture of hydrogen peroxide and aqueous ammonium.

Figure 8D:
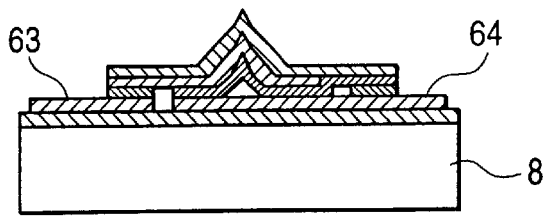

Then, a second substrate 8 as shown in FIG. 8D was prepared by using the technique of Example 1. Subsequently, the first and second semiconductor layers 51, 52 comprising the micro-projection were bonded to the second substrate 8 under pressure. Thereafter, the first substrate 1 was separated along the interface of the peelable layer 4 and the semiconductor layers 51, 52.

Figure 8E:
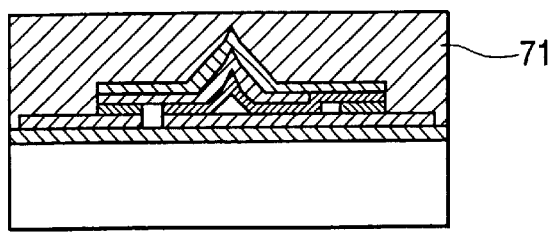
Figure 8F:
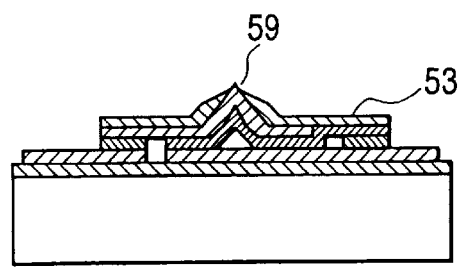

Then, as shown in FIG. 8E, a resist 71 was applied in the same manner as described above by referring to Example 1, and subsequently, the tip was etched to produce an aperture there. Subsequently, the light shield layer 53 and the first semiconductor layer 51 were partly removed from the aperture by etching to produce a micro-aperture 59 in the light shield layer 53 so that the film thickness of the first semiconductor layer 51 was adjusted at the front end thereof. Now, an intended photo detecting probe was produced.

This embodiment comprises a light shield layer having an aperture so that any beams of light entering the micro-projection through areas other than the front end thereof are effectively blocked to consequently eliminate noises and improve the level of resolution.

EXAMPLE 4

In Example 4, a fourth embodiment of the probe of the present invention was prepared as a proximity field photo detecting probe by a fourth mode of carrying out the method of manufacturing a probe according to the invention. The probe of this example has a basic configuration same as that of the first embodiment shown in FIG. 3.

However, this embodiment differs from the first embodiment of FIG. 3 in that the micro-projection has an aperture at the tip thereof.

FIGS. 9A through 9E illustrate the method used for preparing the proximity field probe of this example.

Figure 9A:
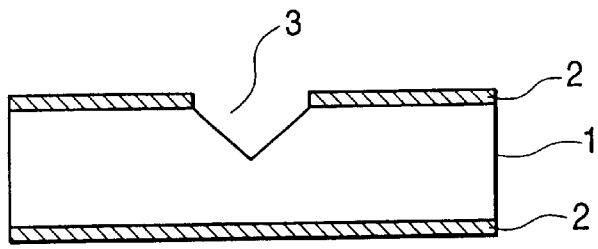
FIGS. 9A, 9B, 9C, 9D and 9E are schematic cross sectional views showing a manufacturing method of the probe with a micro-projection of a fourth embodiment according to the invention.
Figure 9B:
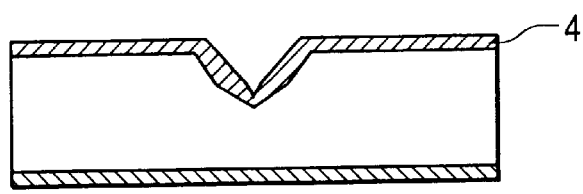

A peelable layer 4 of silicon dioxide was formed on a first substrate 1 as shown in FIGS. 9A and 9B by means of the technique used in Example 3 above.

Figure 9C:
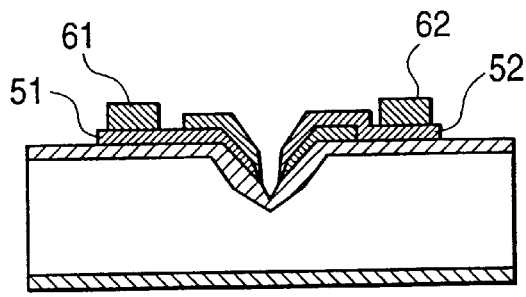
Figure 9D:
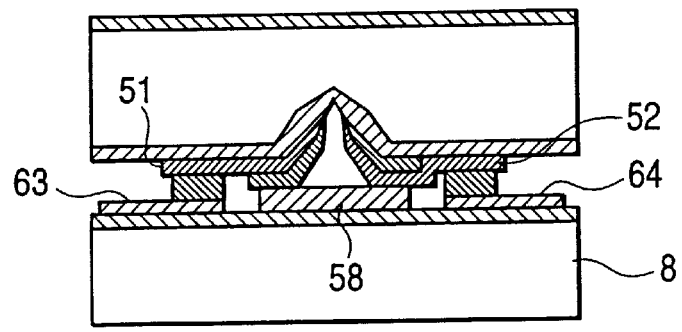

Then, as shown in FIG. 9C, a micro-projection was produced. To do this, firstly a selenium film was formed to a thickness of 100 nm by deposition using a vacuum evaporation technique. Then, the selenium film was etched to produce a first semiconductor layer 51 by photolithography. At this stage of operation, deposition of evaporated particles was blocked at the sharpened part of the peelable layer 4 to produce a part free from deposition of evaporated particles at the tip of the first substrate 51 by rotating the substrate in such a way that evaporated particles may strike and become deposited on the first substrate with an inclination of a predetermined angle during the evaporation process. Then, a 100 nm thick selenium-arsenic SeAs film was formed by vacuum evaporation and etched to produce a second semiconductor layer 52 by photolithography. At this stage of operation, a part free from deposition of evaporated particles was produced at the tip of the second substrate 52 by rotating the substrate in such a way that evaporated particles may strike and become deposited with an inclination on the second substrate as in the case of the first substrate. Then, a first junction assisting layer 61 and a second junction assisting layer 62 were formed by depositing titanium and gold to respective thicknesses of 5 nm and 100 nm for each of them by means of sputtering and subjecting the produced layers to a patterning operation using a photolithography technique. The deposited gold layer was etched by using an aqueous solution of a mixture of iodine and potassium iodide, whereas the deposited titanium was etched by using a mixture of hydrogen peroxide and aqueous ammonium. A silicon substrate carrying an oxide film on the surface was then used for the second substrate 8 as shown in FIG. 9D. Subsequently, Cr and Au were deposited onto the surface to respective thicknesses of 5 nm and 300 nm by vacuum evaporation, and the produced film layer was subjected to a patterning operation to form a first junction layer 63, a second junction layer 64, a first wire (not shown) and a second wire (not shown) by photolithography and etching. Thereafter, a reflection layer 58 was formed by depositing chromium and aluminium to respective thicknesses of 5 nm and 500 nm by vacuum evaporation and subjecting the produced film layer to a patterning operation.

Then, the first and second semiconductor layers 51, 52 of the micro-projection on the first substrate 1 and the first and second junction layers 63, 64 on the second substrate 8 were arranged vis-a-vis and held in contact with each other. Then, the first and second semiconductor layers 51, 52 and the first and second junction layers 63, 64 were bonded (bonded under pressure) by applying a load to them.

Figure 9E:
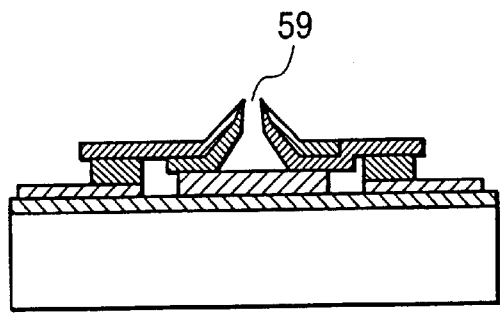

Subsequently, as shown in FIG. 9E, the first substrate 1 and the second substrate 8 were separated from each other along the interface of the peelable layer 4 and the first and second semiconductor layers 51 52. At this stage, the micro-projection showed a height of about 3 μm from the substrate surface. A micro-aperture 59 with a diameter of about 50 nm was formed at the tip of the micro-projection 5. Now, an intended photo detecting probe was produced.

The photo detecting probe of this embodiment detects light at the tip of the micro-projection, and beams of light scattered at the aperture and entering the inside of the micro-projection are reflected by the reflection layer 58 so that they are absorbed by the semiconductor layers in the inside to allow the probe to perform its photo detecting operation with an enhanced level of sensitivity. The embodiment of probe of this example can be made to show a high detection sensitivity to a specific wavelength range typically by using an organic multilayer film for the reflection layer.

EXAMPLE 5

The embodiment prepared in this example was a multiple type light-emitting/light-receiving probe obtained by combining a probe having micro-projections and a light emitting device. FIG. 10B schematically illustrates the configuration of the embodiment. A plurality of photo detecting micro-projections, each having a junction of two semiconductor layers, are provided with respective micro-apertures, and surface light emitting lasers comprising an active layer 303 is arranged on the second substrate 8 at the positions corresponding to the respective micro-apertures 59. The surface light emitting lasers has respective anodes 301 and a common cathode 302. In FIG. 10B, reference numeral 304, 305 and 306 denote a mirror layer, a silicon nitride layer and a polyimide film layer respectively.

Figure 10A:
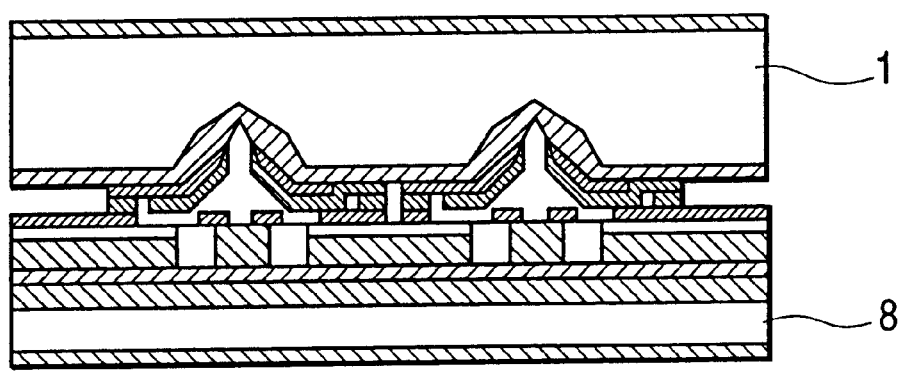
FIGS. 10A and 10B are schematic cross sectional views showing a manufacturing method of the probe with a micro-projection of a fifth embodiment according to the invention.
Figure 10B:
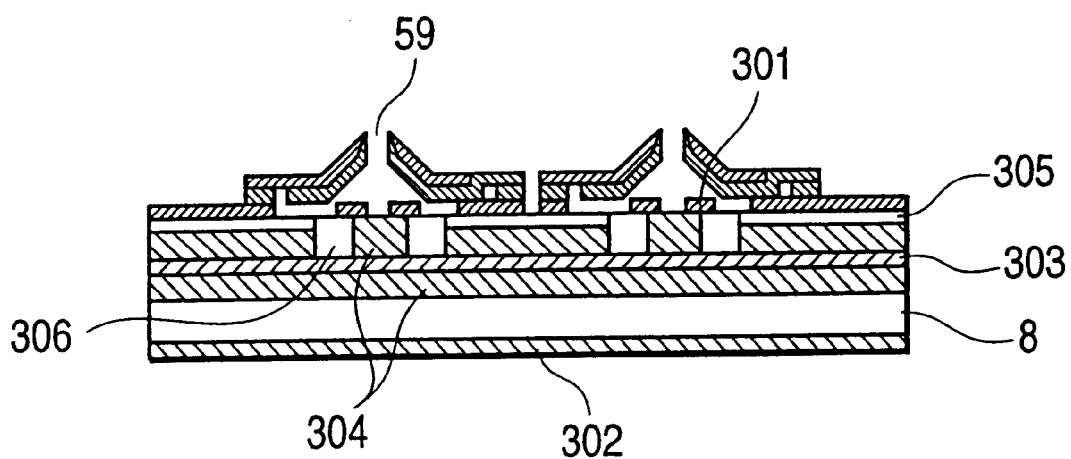

FIGS. 10A and 10B illustrate the method of manufacturing the embodiment.

Firstly, a plurality of micro-projections were formed on the first substrate 1 by means of the technique used in Example 4 above. Then, a second substrate 8 was prepared so as to make it carry thereon surface light emitting lasers that are arranged in the form of a matrix at the positions corresponding to the respective micro-apertures 59. The second substrate 8 comprised anodes 301, a cathode 302, an active layer 303, mirror layers 304, a silicon nitride film layer 305 and a polyimide layer 306 formed on a gallium-arsenic substrate. The silicon nitride film layer 305 was formed to insulate the anodes 301. As a voltage is applied between the anodes 301 and the cathode 302, the laser beams generated by the active layer 303 are reflected by the upper and lower mirror layers 304 and emitted through the apertures arranged thereabove.

Then, the micro-projections are bonded onto the second substrate 8 by means of the technique described above by referring to Example 4, and then the first substrate 1 was peeled off as shown in FIG. 10B to produce a multiple type light-emitting/light-receiving probe.

The multiple type optical probe prepared in this example can be used to change the surface condition of an object in micro-regions, as in the exposure of photoresist, by the beam of proximity field light emitted from the respective unit probes. Then, the rate of forming a micro-pattern can be raised by intra-planarly scanning the micro-regions with the beam while turning on/off the probes appropriately. A resist was exposed to the beam emitted from a multiple type optical probe array of this example used as an exposure apparatus to find that a micro-pattern could be formed through exposure to proximity field light and the rate of exposure could be raised. Additionally, the exposure process could be conducted by rigorously monitoring the state of emission of light by means of the photo detecting section. Furthermore, the micro-pattern could be optically observed by means of the same probe.

EXAMPLE 6

In this example, a sixth embodiment of the photo detecting probe according to the invention was prepared. It was a Schottky type photodiode, wherein the micro-projection is formed by a metal layer and a semiconductor layer.

The configuration of the photodiode is substantially same as the embodiment of Example 1 illustrated in FIG. 3. However, the embodiment of this example differs from that of Example 1 in that the first semiconductor layer 51 of the first embodiment was replaced by a metal layer 54 and the second semiconductor layer 52 of the first embodiment was used as a semiconductor layer 55 in this embodiment so that a photo detecting section was produced by a Schottky junction of metal and semiconductor in this embodiment.

FIGS. 11A through 11F illustrate the method used for manufacturing a proximity field photo detecting probe in this example.

Figure 11A:
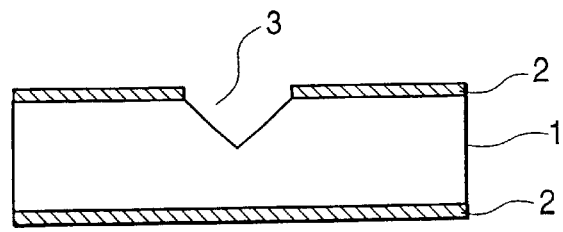
FIGS. 11A, 11B, 11C, 11D, 11E and 11F are schematic cross sectional views showing a manufacturing method of the probe with a micro-projection of a sixth embodiment according to the invention.
Figure 11B:
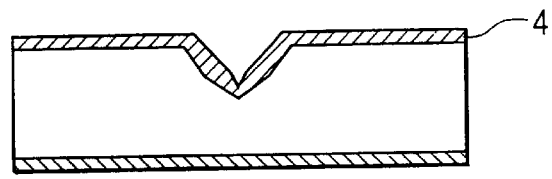

Firstly, as shown in FIGS. 11A and 11B, a peelable layer 4 was formed on a first substrate 1 by using silicon dixodie.

Figure 11C:
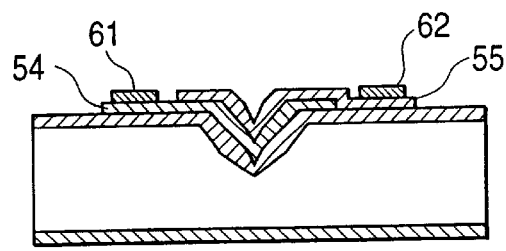

Then, a micro-projection was formed as shown in FIG. 11C. To do this, a 100 nm thick gold film layer was formed by sputtering and was then subjected to a patterning operation by means of a photolithography technique, using an aqueous solution of a mixture of iodine and potassium iodide, to produce a metal layer 54. Then, n-type silicon was deposited to a thickness of 100 nm by means of CVD, using a mixed gas of silane and phosphine and then subjected to a patterning operation to produce a semiconductor layer 55 by means of photolithography. $SF_6$ was used for the dry etching of the silicon. Thereafter, titanium and gold were deposited to respective thicknesses of 5 nm and 100 nm by sputtering and were subjected to a patterning operation by means of photolithography to produce a first junction assisting layer 61 and a second junction assisting layer 62. A mixed solution of iodine and potassium iodide was used to etch the gold layer, whereas a mixed solution of hydrogen peroxide and ammonium was used to etch the titanium layer.

Figure 11D:
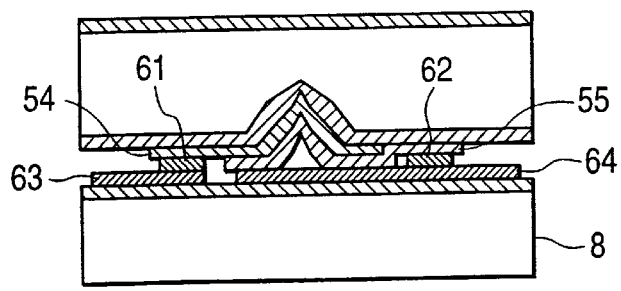

Then, a silicon substrate carrying an oxide film on the surface was prepared for the second substrate 8 as shown in FIG. 11D. Subsequently, Cr and Au were deposited onto the surface to respective thicknesses of 5 nm and 300 nm by vacuum evaporation, and the produced film layer was subjected to a patterning operation to form a first junction layer 63, a second junction layer 64, a first wire (not shown) and a second wire (not shown) by photolithography and etching.

Then, the metal layer 54 and the semiconductor layers 55 on the first substrate and the first junction layer 63 and the second junction layer 64 on the second substrate 8 were arranged vis-a-vis for alignment and held in contact with each other as shown in FIG. 11D. Then, the metal, layer, the semiconductor layer 55, the first junction layer 63 and the second junction layer 64 were bonded (bonded under pressure) by applying a load to them.

Subsequently, the first substrate 1 and the second substrate 8 were separated from each other along the interface of the peelable layer 4 and the metal layer 54 and the semiconductor layer 55. At this stage, the micro-projection showed a height of about 3 μm from the substrate surface.

Figure 11E:
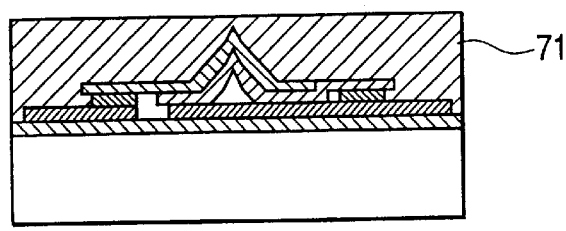
Figure 11F:
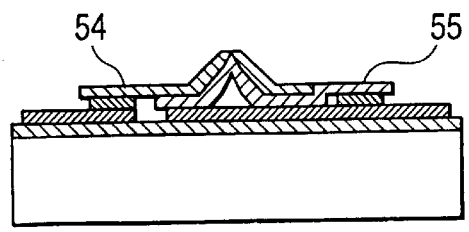

Then, as shown in FIGS. 11E and 11F, the tip of the metal layer 54 was etched by means of the technique used in Example 1.

Thus, it was possible to produce a probe having an enhanced level of detection sensitivity by adjusting the distance between the tip of the probe and the junction interface. Now, an intended photo detecting probe was produced.

EXAMPLE 7

The embodiment of Example 7 was a cantilever type temperature sensing probe.

The micro-projection of this embodiment has a configuration substantially same as that of the probe of FIG. 3 but differs from the latter in that the first semiconductor layer 51 was replaced by a first metal layer 56 and the second semiconductor layer 52 was replaced by a second metal layer 57.

The probe of this embodiment was adapted to detect the temperature of a micro-region by drawing out the thermal electromotive force generated on the interface of the first metal layer 56 and the second metal layer 57 by way of a first wire (not shown) and a second wire 66.

As in the case of Example 2, a micro-projection was formed on a cantilever and had cavity within the microprojection.

FIGS. 12A through 12E illustrate the manufacturing process of the probe of this embodiment. The method used for manufacturing the probe will be described hereinafter by referring to the drawings.

Figure 12A:
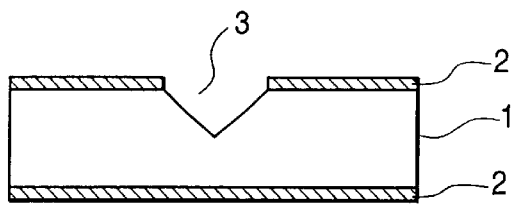
FIGS. 12A, 12B, 12C, 12D and 12E are schematic cross sectional views showing a manufacturing method of the probe with a micro-projection of a seventh embodiment according to the invention.

Firstly, as shown in FIG. 12A, an inverted-pyramid-shaped recess 3 was formed on the first substrate 1 by means of the technique used in Example 1.

Figure 12B:
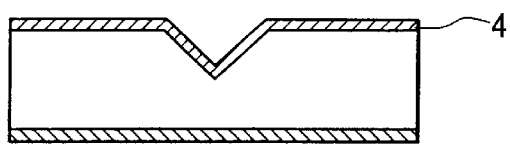

Then, as shown in FIG. 12B, silicon nitride was deposited to a thickness of 50 nm to form a peelable layer 4 by means of low pressure CVD using a mixed gas of dichlorosilane and ammonium.

Figure 12C:
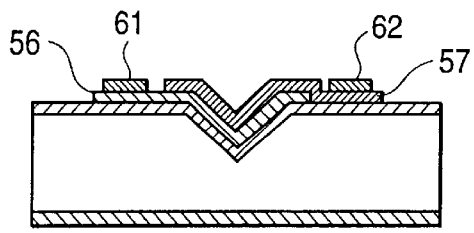

Thereafter, as shown in FIG. 12C, a micro-projection was produced. To do this, a 100 nm thick film of a platinum-rhodium alloy containing Pt and Rh respectively by 60% and 40% was formed by sputtering and subjected to a patterning operation to produce a first metal layer 56. Then, another 100 nm thick film of a platinum-rhodium alloy containing Pt and Rh respectively by 80% and 20% was formed by sputtering and subjected to a patterning operation to produce a second metal layer 57. A dry etching technique using argon gas was employed for the etching process of the patterning operation.

Then, titanium and gold were deposited to respective thicknesses of 5 nm and 100 nm by sputtering and subjected to a patterning operation using a photolithography technique, to produce a first junction assisting layer 61 and a second junction assisting layer 62. The gold and the titanium were etched respectively by using an aqueous solution of a mixture of iodine and potassium iodide and an aqueous solution of a mixture of hydrogen peroxide and ammonium.

Figure 12D:
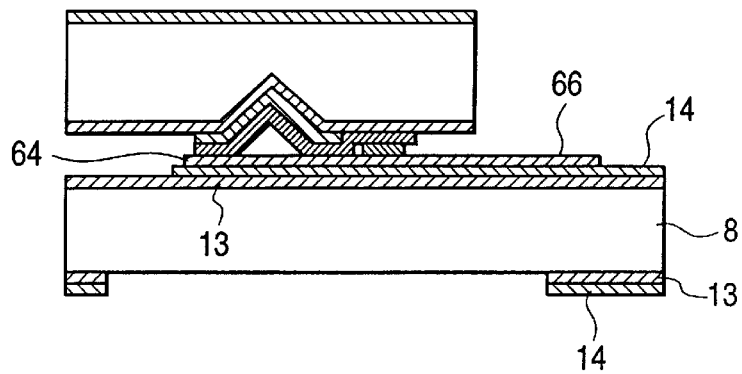

Subsequently, as shown in FIG. 12D, a monocrystal silicon substrate was used for the second substrate 8, on both sides of which a silicon dioxide film layer 13 and a silicon nitride film layer 14 were formed to respective thicknesses of 0.3 μm and 0.5 μm. Then, the silicon nitride layer 14 on the surface was subjected to a patterning operation to produce a cantilever using photolithography and etching. The cantilever had a width of 50 μm and a length of 300 μm. Thereafter, a 3 nm thick titanium Ti film and a 50 nm thick gold Au film were formed and subjected to a patterning operation using photolithography and etching, to produce a first junction layer (not shown), a second junction layer 64, a first wire (not shown) and a second wire 66 on the silicon nitride layer 14 having a profile of a cantilever.

Then, the first and second metal layers 56, 57 were bonded onto the cantilever-shaped silicon nitride layer 14 by means of the technique used in Example 1.

Figure 12E:
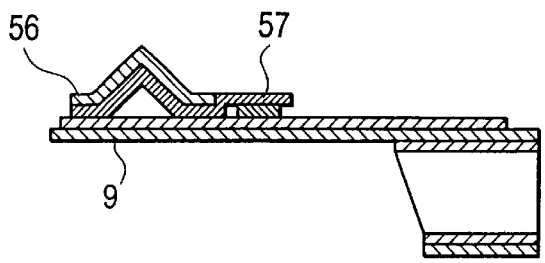

Subsequently, a polyimide layer was applied to the surface of the second substrate 8 by spin coating and baked to produce a protection layer, and thereafter, the silicon substrate 8 was etched from the rear surface by means of a 30% aqueous solution of potassium hydroxide using the silicon nitride layer 14 on the rear surface as mask. Then, the silicon dioxide layer 13 was removed by means of an aqueous solution of a mixture of hydrofluoric acid and ammonium fluoride. Finally, the surface protection layer was removed by oxygen plasm to produce a cantilever-type probe as shown in FIG. 12E. Now, an intended cantilever-type temperature sensing probe was prepared.

While two alloys of platinum and rhodium with different compositions were used in this embodiment, any combinations of metals or alloys that are normally used for thermocouples may be used for the purpose of the invention. Such combinations include those of platinum-platinum/rhodium, chromel-alumel, copper-constantan, gold-silver, platinum-nickel silver and bismuth-antimony.

In this Example, a temperature sensing micro-projection was formed on a cantilever, which was then made to contain a cavity to reduce the thermal capacity of the detecting section and improve both the level of detecting resolution and the response speed.

As described above in detail, the present invention provide a probe comprising a photo detecting or temperature sensing micro-projection and a method of manufacturing such a probe. Additionally, according to the invention, the micro-projection can be produced with an excellent reproducibility particularly in terms of profile and with a sharp tip. Still additionally, the female mold for molding the micro-projection can be used repeatedly to improve the productivity and reduce the manufacturing cost.

According to the invention, a photo detecting probe that can provide an output with an improved S/N ratio and an enhanced level of resolution can be realized by arranging thereon a micro-projection comprising two layers of different materials having a junction interface therebetween, wherein the two layers of different materials are connected to either one of the two junction layers to be electrically isolated.

According to the invention, since the micro-projection contains a cavity within it, the electric capacitance or the thermal capacity, whichever appropriate, of the detecting section of the probe can be reduced to improve the response time of detecting operation. Additionally, according to the invention, optical information of the specimen can be collected without damaging the specimen by forming the micro-projection of the probe on an elastic body.

According to the invention, the beam of light entering the micro-projection by way of areas other than the tip thereof can be blocked to shut off noises and improve the resolution by arranging a light shield layer on the surface of the micro-projection except the tip of the projection.

According to the invention, a micro-aperture may be formed at the tip of the micro-projection and made to communicate with the cavity inside the micro-projection to form a multiple type light-emitting/light-receiving optical probe that is provided with a means for emitting light through the miciro-aperture. With such an arrangement, a micro-pattern can be formed through exposure to proximity field light and the rate of exposure can be enhanced. Then, the exposure process can be conducted by rigorously monitoring the state of emission of light by means of the photo detecting section. Furthermore, the micro-pattern can be optically observed by means of the same probe.

Furthermore, according to the invention, a temperature sensing probe can be realized by using a micro-projection, wherein the two material layers are connected to either one of the junction layers to be electrically isolated. Such a probe can provide an output with an improved level of resolution and an enhanced response speed.

What is claimed is:

1. A probe with a micro-projection comprising:

a substrate;

first and second junction layers arranged on said substrate and electrically isolated from each other, said first and second junction layers being made of an electrocoductive material;

a micro-projection bonded to said substrate by way of said first and second junction layers and having a cavity in the inside;

said micro-projection comprising first and second material layers made of different respective materials and laid one on the other to form a junction interlayer therebetween, said first and second material layers being electrically connected to said first and second junction layers respectively and independently.

2. A probe with a micro-projection comprising:

a substrate;

a cantilever of an elastic body formed on said substrate;

first and second junction layers arranged on said cantilever and electrically isolated from each other, said first and second junction layers being made of an electrocoductive material;

a micro-projection bonded to said cantilever by way of said first and second junction layers and having a cavity in the inside;

said micro-projection comprising first and second material layers made of different respective materials and laid one on the other to form a junction interlayer therebetween, said first and second material layers being electrically connected to said first and second junction layers respectively and independently.

3. A probe according to claim 1 or 2, wherein said first and second material layers are respectively first and second semiconductor layers having mutually different respective conducting types, a pn junction interface being formed between said layers.

4. A probe according to claim 3, wherein said first and second semiconductor layers are made of an amorphous semiconductor material.

5. A probe according to claim 1 or 2, wherein one of said first and second material layers is a metal layer and the other is a semiconductor layer and a Schottky junction interface is formed between said layers.

6. A probe according to claim 1 or 2, wherein said first and second material layers are respectively first and second metal layers made of different respective metals and arranged so as to generate thermal electromotive force at the interface therebetween.

7. A probe according to claim 1 or 2, further comprising:

a light shield layer covering said micro-projection and having an aperture formed at the tip of said micro-projection.

8. A probe according to clam 1 or 2, wherein said first and second material layers are provided with an aperture formed at the tip of said micro-projection.

9. A probe according to claim 8, further comprising:

a laser beam source emitting a laser beam through said aperture.

10. A proximity field optical microscope comprising a probe according to claim 3, a prism arranged vis-a-vis to the probe and on which a specimen is placed, a voltage application circuit for applying a voltage to said first and second semiconductor layers and an electric current detection circuit for detecting the electric current flowing through said first and second semiconductor layers.

11. A proximity field optical microscope according to claim 10, further comprising:
a drive means for driving the probe in response to the electric current detected by said electric current detection circuit.

12. A method of manufacturing a probe with a micro-projection comprising steps of:
forming a recess on the surface of a first substrate;
forming first and second material layers made of different respective materials and laid one on the other on the surface of the first substrate having said recess to form a junction interlayer therebetween;
forming first and second junction layers made of an electrocoductive material and electrically isolated from each other on a second substrate;
bonding said first and second material layers on said first substrate respectively to the first and second junction layers on the second substrate, the first and second material layers being electrically connected to the first and second junction layers respectively and independently;
separating the first and second material layers bonded to the first and second junction layers from the first substrate so as to produce a micro-projection having a cavity in the inside with the first and second material layers formed on the recess of the first substrate.

13. A method of manufacturing a probe with a micro-projection comprising steps of:
forming a recess on the surface of a first substrate;
forming first and second material layers made of different respective materials and laid one on the other on the surface of the first substrate having said recess to form a junction interlayer therebetween;
forming an elastic body layer on a second substrate;
forming first and second junction layers made of an electrocoductive material and electrically isolated from each other on said elastic body layer;
bonding said first and second material layers on said first substrate respectively to the first and second junction layers on the elastic body layer, the first and second material layers being electrically connected to the first and second junction layers respectively and independently;
separating the first and second material layers bonded to the first and second junction layers from the first substrate so as to produce a micro-projection having a cavity in the inside with the first and second material layers formed on the recess of the first substrate; and
forming a cantilever from said elastic body layer by removing part of said second substrate.

14. A manufacturing method according to claim 12 or 13, further comprising:
a step of forming a peelable layer between the surface of said first substrate including said recess and the first and second material layers;
said first substrate being separated along the interface between said peelable layer and said first and second material layers.

15. A manufacturing method according to claim 12 or 13, further comprising:
a step of forming first and second junction assisting layers respectively on said first and second material layers formed on the surface of said first substrate including said recess;
said first and second material layers are respectively bonded to said first and second junction layers on said second substrate by way of the first and second junction assisting layers.

16. A manufacturing method according to claim 12 or 13, wherein
said first and second material layers are respectively first and second semiconductor layers having mutually different respective conducting types, a pn junction interface being formed between said layers.

17. A manufacturing method according to claim 16, wherein
said first and second semiconductor layers are made of an amorphous semiconductor material.

18. A manufacturing method according to claim 12 or 13, wherein
one of said first and second material layers is a metal layer and the other is a semiconductor layer and a Schottky junction interface is formed between said layers.

19. A manufacturing method according to claim 12 or 13, wherein
said first and second material layers are first and second metal layers made of different respective metals and adapted to generate thermal electromotive force at the interface therebetween.

20. A manufacturing method according to claim 12 or 13, further comprising:
steps of forming a light shield layer covering said micro-projection and forming an aperture at the tip of said micro-projection.

21. A manufacturing method according to clam 12 or 13, further comprising:
a step of forming an aperture in said first and second material layers at the tip of said micro-projection.

22. A manufacturing method according to claim 21, further comprising:
a step of forming a laser beam source emitting a laser beam through said aperture.

* * * * *

UNITED STATES PATENT AND TRADEMARK OFFICE
CERTIFICATE OF CORRECTION

PATENT NO. : 6,337,477 B1
DATED : January 8, 2002
INVENTOR(S) : Shimada et al.

It is certified that error appears in the above-identified patent and that said Letters Patent is hereby corrected as shown below:

Title page,
Item [56] References Cited, OTHER PUBLICATIONS, "N ear-Field" should read -- Near-Field --.

Column 1,
Lines 38 and 44, "SNOM" should read -- NSOM --.

Column 3,
Lines 26 and 47, "electrocoductive" should read -- electroconductive --.

Column 13,
Line 66, "51 52." should read -- 51, 52. --.

Column 14,
Line 37, "comprised" should read -- comprises --.

Column 15,
Line 50, "metal, layer," should read -- metal layer, --.

Column 18,
Line 30, "coductive" should read -- conductive --.

Column 19,
Line 45, "electrocoductive" should read -- electroconductive --.

Signed and Sealed this

Eleventh Day of June, 2002

Attest:

JAMES E. ROGAN
Attesting Officer
Director of the United States Patent and Trademark Office